April 1, 1930.  E. KÄHNE  1,752,953
METHOD OF MANUFACTURING SPECTACLE FRAMES FROM
TORTOISE SHELL AND SIMILAR VALUABLE MATERIAL
Filed April 5, 1929
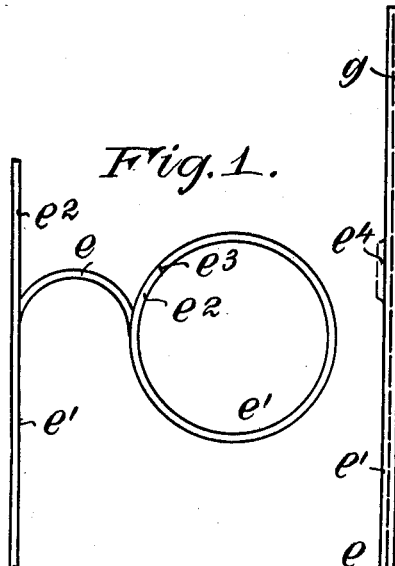
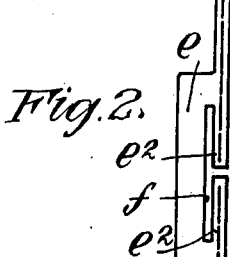
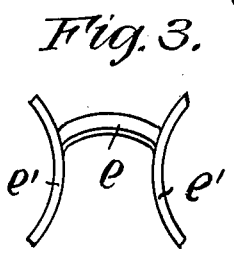
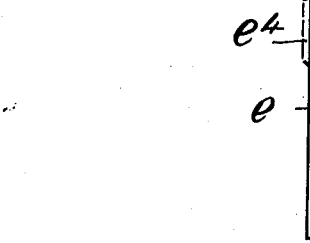
Inventor:
Ernst Kähne
by:
Watson, Coit, Morse & Grindle
Attorney.

Patented Apr. 1, 1930

1,752,953

UNITED STATES PATENT OFFICE

ERNST KÄHNE, OF RATHENOW, GERMANY, ASSIGNOR TO THE FIRM THEODOR KÄHNE & SÖHNE, OF RATHENOW, GERMANY

METHOD OF MANUFACTURING SPECTACLE FRAMES FROM TORTOISE-SHELL AND SIMILAR VALUABLE MATERIAL

Application filed April 5, 1929, Serial No. 352,881, and in Germany November 18, 1927.

My invention relates to improvements in the method of manufacturing spectacle frames from tortoise-shell and similar valuable material, and the object of the improvements is to provide a method by means of which spectacle frames can be made from tortoise-shell at low cost, and in which the loss of material is reduced to a minimum. With this object in view my invention consists in manufacturing the spectacle frame from a blank comprising the bridge part and the rim parts in the form of elongated members made integral with the bridge part, bending the said rim parts into the rims and joining the ends of the rim parts.

For the purpose of explaining the invention my improved method has been illustrated in the accompanying drawings in which Fig. 1, is an elevation showing a blank from which the spectacle frames are made, the figure illustrating the first step of the improved manufacture of the frame, Fig. 2, is an elevation showing the second step of the manufacture, one of the rim portions being bent together and joined at its ends into a rim, and Fig. 3, is a partial elevation showing the bridge and parts of the rims.

Referring now to my improved method illustrated in Figs. 1 to 3, the frame is manufactured from a blank having the form illustrated in Fig. 1 and comprising the median portion $e$ having a T-shaped cut $f$ and made integral with two long strips $e'$ disposed in line with the portions $e^2$, $e^2$ of the median portion $e$, the length of the elongated portions $e'$, $e^2$ being equal to the circumference of the rim to be produced. I wish it to be understood that Fig. 1 is only a diagrammatical view illustrating the principle of the present invention and that I do not limit myself to the form shown in the said figure, the form of the blank largely depending on the desired final shape of the spectacle frame.

From the blank shown in Fig. 1 the spectacle frame is formed by bending the elongated portions $e'$, $e^2$ into circular form and uniting the ends of the elongated portions by heat and under pressure. By using also the portions $e^2$ forming parts of the median part $e$ of the blank for forming the rims the total length of the blank may be reduced by the length of the portions $e^2$ formed by the indentation $f$, and further, the joining of the ends of the rim portions can be easily performed. But I wish it to be understood that my invention is not limited to the form of the blank shown in Fig. 1, and that in some cases the portions $e^2$ are omitted, in which case the outer ends of the elongated portions $e^1$ are joined to the bridge portion $e$.

The plate from which the blank shown in Fig. 1 is made can be comparatively thin, the thickness of the plate corresponding to the thickness of the finished frame, because after bending the frame only polishing is needed. Further, the grooves in which the lenses are mounted within the rims can be cut in the elongated strips $e'$, $e^2$ before bending the same into circular form, the said grooves being indicated in Fig. 1 by the dotted line $g$. In the figure the grooves are provided on the bottom side of the blank.

Fig. 2 shows that the member $e$ is transformed into the form of the bridge by merely bending the same into the form of an arc. In the said figure the left hand rim $e^1$, $e^2$ is still in straight form, while the right hand rim has been bent into circular form, the ends of the elongated part $e^1$, $e^2$ being indicated $e^3$. When making the bridge $e$ only a slight deformation is needed which can be effected while bending the part $e$ in so far as the median part must be disposed angularly of the plane of the rims $e'$ as is indicated in Fig. 3.

In some cases the blank is provided with other projecting portions such for example as $e^4$, the part $e^4$ being used for making the hinges for the bows of the spectacles.

It is not necessary to make the whole blank shown in Fig. 1 from an integral piece. In some cases, for example where a part of the shell is broken, or it is desired to use as far as possible the whole area of the shell a part of one of the shanks $e'$ or the whole shank may be united to the blank by heat and pressure.

My invention is particularly important in the manufacture of spectacle frames from valuable material such as tortoise-shell. But I wish it to be understood that it is not limited to such manufacture, and that it may be used for making spectacle frames from other material.

I claim:

1. The herein described method of manufacturing spectacle frames, which consists in cutting an elongated blank from a plate comprising a bridge portion and the rim portions disposed in a plane, bending the rim portions into circular form and uniting the ends thereof at a point spaced from the bridge portion, and bending the bridge portion into the form of the bridge.

2. The herein described method of manufacturing spectacle frames, which consists in cutting an elongated blank from a plate comprising a bridge part and the rim portions disposed in a plane, the bridge portion being provided with a T-shaped indentation, bending the rim portions and the portions of the bridge portion located in alignment therewith into circular form and uniting the ends thereof, and bending the bridge portion into the form of the bridge.

3. A blank for use in the manufacture of spectacles consisting of a one-piece elongated strip of material having a slot in one side thereof substantially midway of the ends of the strip, said slot being enlarged within and longitudinally of said strip to form a bridge portion and rim portions overlapping said bridge portion.

In testimony whereof I affix my signature.

ERNST KÄHNE.